United States Patent

Howell et al.

[15] 3,647,276
[45] Mar. 7, 1972

[54] STAR IMAGE MOTION COMPENSATOR

[72] Inventors: William E. Howell, Yorktown; Aaron J. Ostroff, Newport News, both of Va.

[73] Assignee: The United States of America as represented by the Administrator of the National Aeronautics and Space Administration

[22] Filed: Apr. 28, 1970

[21] Appl. No.: 32,665

[52] U.S. Cl..................................350/16, 350/52, 356/248, 250/203
[51] Int. Cl. .......................................................G02b 23/02
[58] Field of Search .............350/16, 52; 256/143, 149, 248, 256/250; 250/203

[56] References Cited

UNITED STATES PATENTS 3,542,482  11/1970  Wilks......................................356/244
3,346,738  10/1967  Rogers et al. ...........................250/203

FOREIGN PATENTS OR APPLICATIONS 185,500  1/1967  U.S.S.R. ................................356/250

Primary Examiner—David H. Rubin
Attorney—Howard J. Osborn, William H. King and John R. Manning

[57] ABSTRACT

Technique and hardware internal to a telescope for maintaining one or more star images fixed on the focal plane of the telescope despite small motions between a guide star and the telescope. The hardware consists of first and second parallel mirrors that are maintained parallel to each other as they are rotated about an axis through the first mirror. Means are also provided that are responsive to the rotational movement for moving the second mirror relative to the first mirror to maintain the length of the light path from the first mirror to the focal plane constant.

3 Claims, 6 Drawing Figures

INVENTORS
WILLIAM E. HOWELL
AARON J. OSTROFF
BY
ATTORNEYS

INVENTORS
WILLIAM E. HOWELL
AARON J. OSTROFF
BY
ATTORNEYS

STAR IMAGE MOTION COMPENSATOR

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The invention relates generally to telescopes and more specifically concerns optics internal to a telescope for maintaining the star image at the same point on the focal plane of the telescope despite motions between the telescope and the star.

Whenever a telescope is placed in orbit about the earth and pointed in the direction of a star any small movement of the telescope relative to the star will cause the star image to move on the focal plane of the telescope. It is important that the star image be maintained at the same point on the focal plane. One way of doing this is to sense any movement of the star image on the focal plane and by means of an actuator move the entire telescope to bring the star image back to its original location on the focal plane. The obvious disadvantage of this technique is that the entire telescope structure has to be controlled thereby requiring large control torques.

It is the purpose of this invention to provide means internal to the telescope for maintaining the star image at the same point on the focal plane of the telescope despite small motions between the telescope and the star. Inasmuch as the inertia of this means is small, only small control torques are required.

SUMMARY OF THE INVENTION

The invention consists essentially of a first mirror and a second mirror located inside the telescope and mounted parallel to each other such that light coming into the telescope is reflected by the first mirror onto the second mirror where it is reflected to the focal plane of the telescope. Consequently, if the telescope is pointed at a star the image of the star will be located on the focal plane at a specific location. If the telescope moves relative to the star, then the image of the star will move on the focal plane. Means are provided for rotating the two mirrors, while maintaining them parallel, about an axis through the first mirror. Additional means are provided that are responsive to the rotation of the mirrors for maintaining the total distance from the first mirror to the second mirror to the focal plane the same as the two mirrors are rotated. Hence, when the image on the focal plane moves it can be brought back to its initial point by rotating the two mirrors.

DETAILED DESCRIPTION OF THE INVENTION

Figure 1:
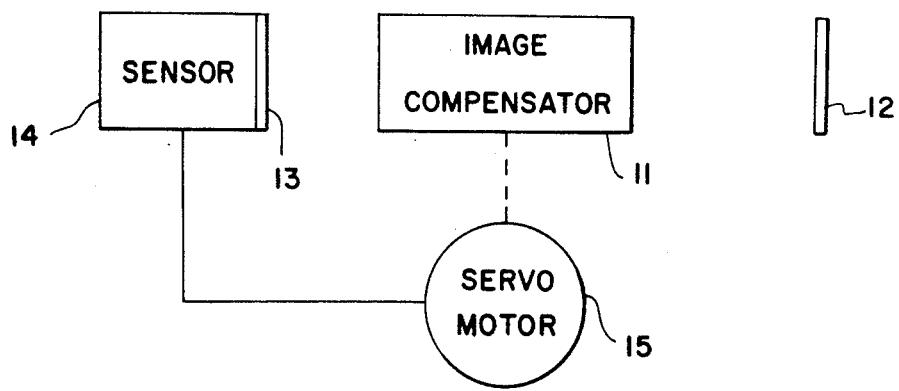
FIG. 1 is a block diagram showing how the invention can be used.

The block diagram in FIG. 1 shows a system in which the invention can be used. Image compensator 11, which is the invention, is located between lens 12 and focal plane 13 of a telescope that is trained on a star to form an image of the star on the focal plane of the telescope. When the telescope is initially alined, sensor 14 does not produce an output, hence servomotor 15 does not affect image compensator 11. However, if the telescope moves slightly with respect to the star, the star image moves on focal plane 13. This motion of the star image is detected by sensor 14 which produces an electric signal that is indicative of both the direction and the magnitude of the motion. The electrical signal produced by sensor 14 is applied to servomotor 15 which applies a mechanical force to image compensator 11 to cause it to bring the star image back to its initial point on focal plane 13. Consequently, any small movements of the telescope relative to the star are compensated for by the image compensator 11.

Figure 2:
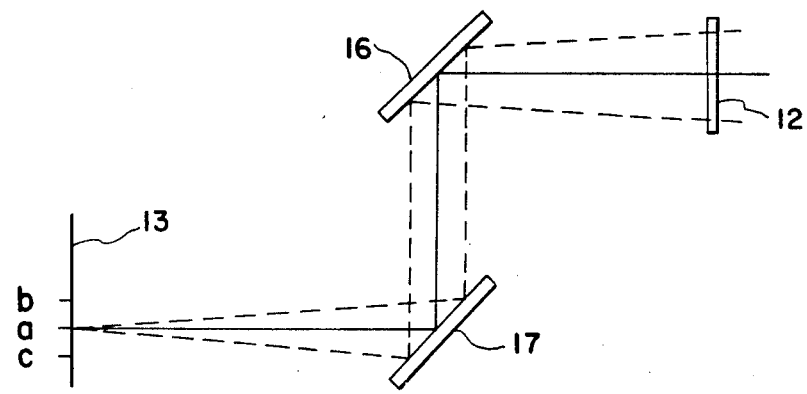
FIGS. 2 and 3 are schematic drawings for the purpose of illustrating the technique used in the invention.
Figure 3:
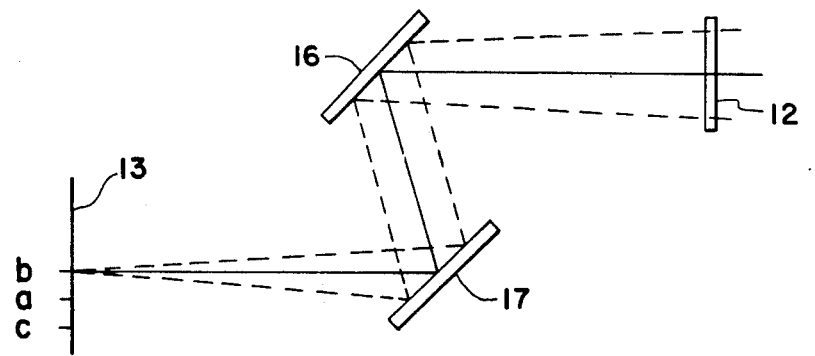

The illustration in FIGS. 2 and 3 are for the purpose of describing the technique of the invention. In the illustration in FIG. 2 rays from a star pass through telescope lens 12 and after being reflected by two plane parallel mirrors 16 and 17, the star is imaged at point $a$ on the focal plane 13. Now assume that the telescope is stationary. Then rotate mirrors 16 and 17 about an axis through mirror 16 while maintaining the two mirrors parallel. By doing this, the star is imaged on a plane that is parallel to focal plane 13, but the star image is changed in focus. This change in focus can be eliminated if the light path length from the mirror 16 to focal plane 13 is maintained constant. This can be accomplished by translating mirror 17 as it is rotated. An illustration of this is shown in FIG. 3. Both mirrors have been rotated through the same angle and the image has been translated along the focal plane. The distance between the two mirrors has been changed but the total path length remains constant. It can be shown that the motion of mirror 17 describes a parabola. As can be seen, by making the rotation and translation as shown in FIG. 3 the position of the image has been changed from point $a$ to point $b$ on focal plane 13. Hence, assume that the telescope is initially alined on the star as shown in FIG. 2 and now assume that there is motion of the telescope relative to the star so that the star image is moved to point $c$ where the distance from $c$ to $a$ is equal to the distance from $a$ to $b$. Then if the mirrors are rotated and mirror 17 is translated as shown in FIG. 3 the star image will move from $c$ to $a$ which was the initial point of the star image.

Figure 4:
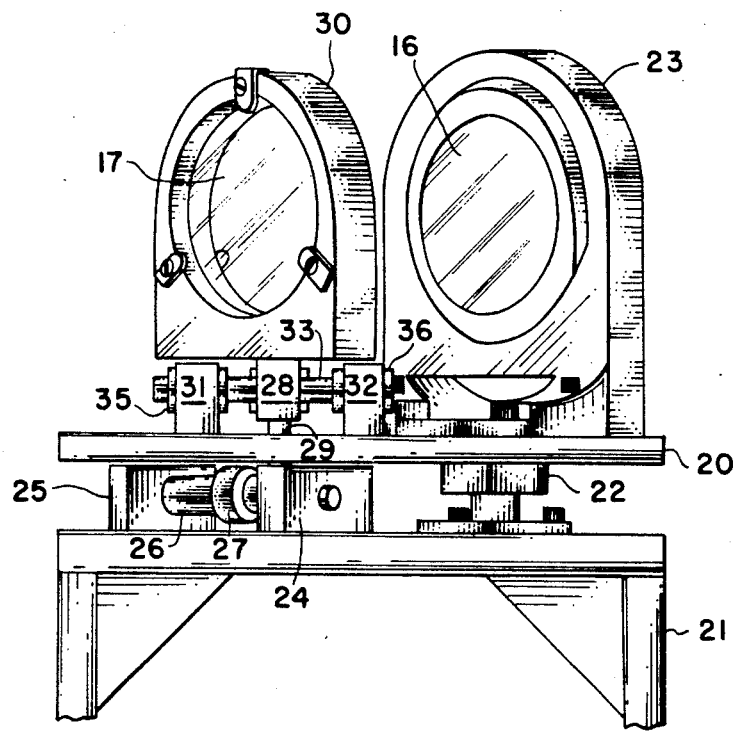
FIG. 4 is a pictorial side view of an embodiment of the invention.
Figure 5:
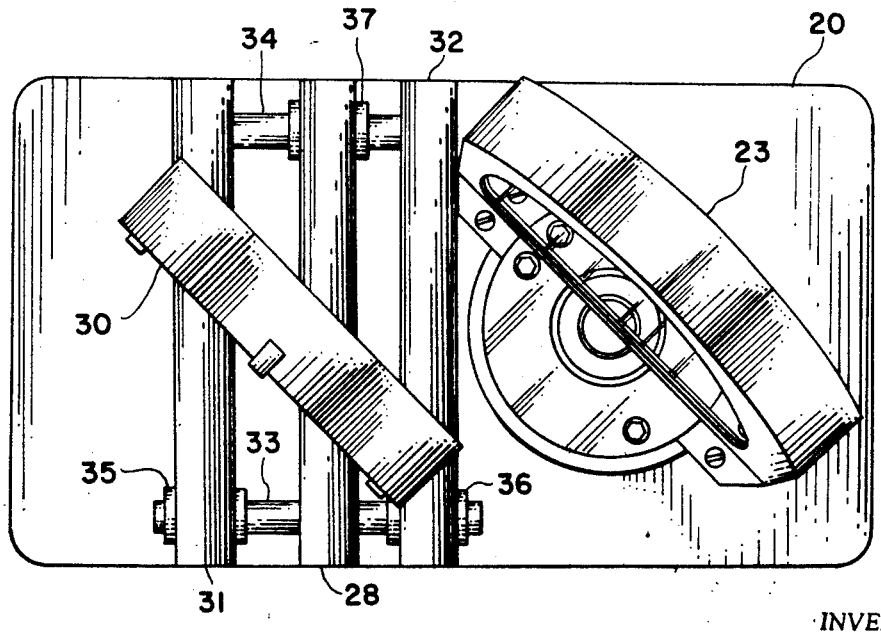
FIG. 5 is a pictorial top view of an embodiment of the invention.

Hardware for carrying out the technique described in FIGS. 2 and 3 is shown in FIGS. 4 and 5. A top plate 20 is mounted for rotation on a base assembly 21 about a spindle 22. Spindle 22 is attached to base assembly 21 and top plate 20 is placed on spindle 22 so it is free to rotate about the spindle. A mirror holder 23 for holding mirror 16 is attached to top plate 20 such that when top plate 20 rotates on spindle 22 the axis of rotation passes through the front surface of mirror 16. Mirror holder 23 is mounted such that mirror 16 makes a 45° angle with the edges of top plate 20. The edges of top plate 20 are perpendicular to the optical axis when in alined position. Two shaft supports 24 and 25 are attached to base assembly 21 to support a shaft 26 in a fixed position. Shaft 26 makes an angle of 45° with the edges of base assembly 21 and the edges of top plate 20 when it is in its alined position. A guide bearing 27 is mounted on shaft 26 so that the bearing is free to move back and forth on the shaft. Guide bearing 27 is attached to a bearing support 28 by means of a shaft 29. Bearing support 28 is attached to a mirror holder 30 which holds mirror 17. Shaft supports 31 and 32 are mounted on top plate 20 at right angles with edges of top plate 20 to support shafts 33 and 34. Shaft 33 is mounted on shaft supports 31 and 32 by means of bearings 35 and 36 so that shaft 33 is free to move relative to shaft supports 31 and 32. Shaft 34 is attached to shaft supports 31 and 32 such that shaft 34 is fixed relative to these supports. Guide bearing 28 is mounted on shaft 33 in a fixed and 32 such that 34 is fixed position so that guide bearing 28 does not move relative to shaft 33. Guide bearing 28 is mounted on shaft 34 by means of a bearing 37 so that the guide bearing 28 can move along this shaft 34.

In the operation of this invention if a rotational force is applied to top plate 20 it will rotate about spindle 22. Hence, mirrors 16 and 17 will rotate together about spindle 22 and will be maintained parallel as they rotate. The rotation of top plate 20 causes guide bearing 27 to move along shaft 26. This applies a force to support 28 moving it along shafts 33 and 34 relative to supports 31 and 32. Hence, mirror support 30 moves relative to mirror support 23 while maintaining the two mirror supports parallel to each other. Consequently, the two mirrors are always maintained parallel to each other and at the same time the total distance from mirror 16 to mirror 17 to the focal plane of the telescope is always maintained the same.

Figure 6:
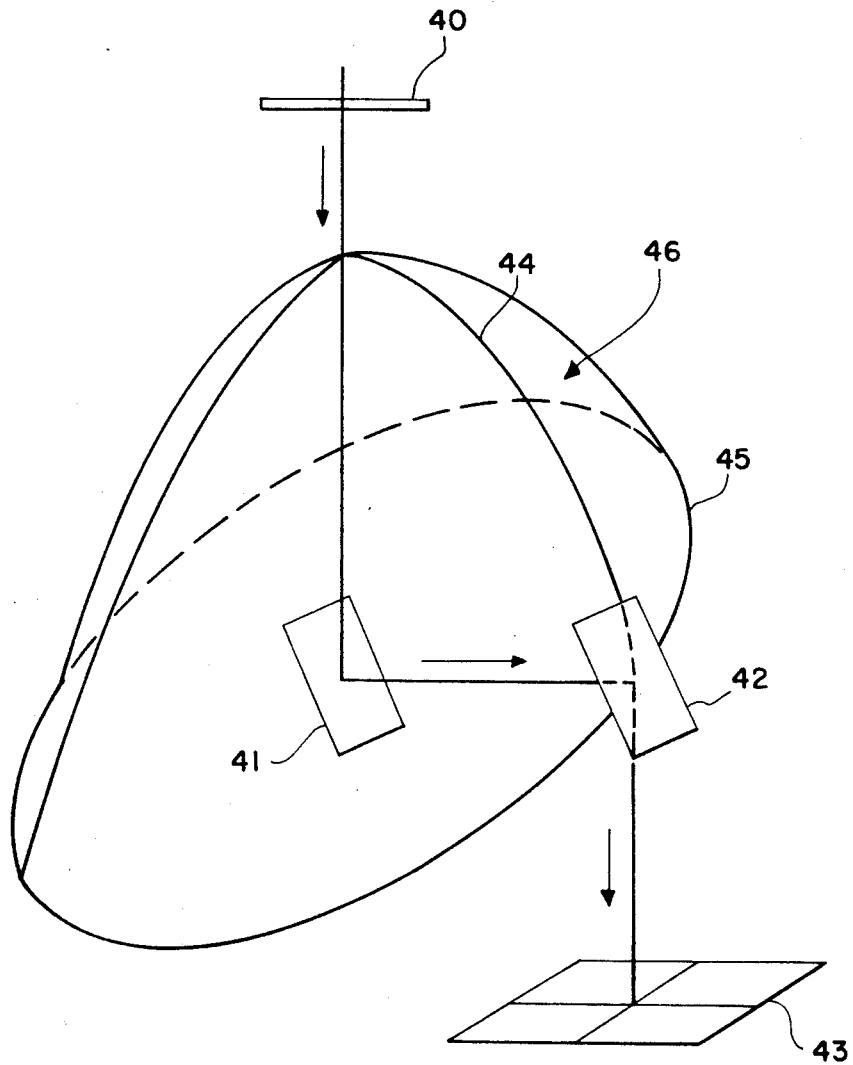
FIG. 6 is a schematic diagram illustrating a two-axis technique for controlling a star image on the focal plane of a telescope.

The system illustrated in FIGS. 2 and 3 is for control along a single axis of the focal plane. If control along both axes of the focal plane is required a two-axis system is needed. Such a system is illustrated in FIG. 6. The main change is that one of the mirrors should be tangent to a surface that is a paraboloid of revolution. Light enters the telescope through lens 40 and is reflected by mirrors 41 and 42 onto the focal plane 43 of the telescope. If mirrors 41 and 42 are rotated about an axis through mirror 41 and mirror 42 moves along parabola 44 the image on focal plane 43 is controlled along one of its axes. If the two mirrors are rotated and mirror 42 moves along circle 45 then the image is controlled along the other perpendicular axis of focal plane 43. Hence, if mirror 42 moves along the surface or is tangent to the surface of paraboloid 45 as the two mirrors are rotated then control is maintained over the surface of focal plane 43.

The advantage of this invention is that by using small optics internal to the telescope a control system for star image stabilization is provided which reduces the stringent pointing requirements on the large telescope structure.

It is to be understood that the form of the invention herewith shown and described is to be taken as a preferred embodiment. Hardware, other than that described in FIGS. 4 and 5, could possibly be designed that would carry out the technique disclosed in FIGS. 1, 2 and 6 without departing from the spirit and scope of this invention as defined in the following claims.

What is claimed as new and desired to be secured by Letters Patent of the United States is:

1. Apparatus for maintaining a star image fixed on the focal plane of a telescope despite small motions between the star and the telescope comprising:
   a first mirror located inside said telescope in the path of the light that passes through the objective lens of said telescope such that light from said star is reflected by said first mirror;
   a second mirror parallel to said first mirror for reflecting said light reflected by said first mirror onto said focal plane at a specific location;
   means for rotating said first mirror relative to said telescope about an axis through said first mirror; and
   means responsive to the rotation of said first mirror for maintaining the second mirror parallel to said first mirror and for moving said second mirror relative to said first mirror such that the distance from said first mirror to said focal plane via said second mirror is always the same whereby said star image can be maintained at said specific location in the event there is any motion of said telescope relative to said star.

2. Apparatus according to claim 1 wherein said means for moving said second mirror relative to said first mirror includes a first shaft fixed relative to said telescope and making a 45° angle with said first and second mirrors when they are in their initial position; means for mounting said second mirror on said first shaft such that it will move in either direction along said first shaft; and means for restraining the movement of said second mirror along said first shaft such that said second mirror moves relative to said first mirror while the two mirrors still retain their parallel relationship.

3. Apparatus according to claim 2 wherein said means for restraining the movement of said second mirror includes a second and a third shaft.

* * * * *